(12) United States Patent
Kakinuma et al.

(10) Patent No.: US 12,478,561 B2
(45) Date of Patent: Nov. 25, 2025

(54) DENTAL COMPOSITION AND DENTAL RESTORATIVE KIT

(71) Applicant: GC Corporation, Shizuoka (JP)

(72) Inventors: Hiroaki Kakinuma, Tokyo (JP); Keita Sato, Tokyo (JP); Yuna Sato, Tokyo (JP)

(73) Assignee: GC Corporation, Shizuoka (JP)

( * ) Notice: Subject to any disclaimer, the term of this patent is extended or adjusted under 35 U.S.C. 154(b) by 870 days.

(21) Appl. No.: 17/753,698

(22) PCT Filed: Jun. 29, 2020

(86) PCT No.: PCT/JP2020/025573
§ 371 (c)(1),
(2) Date: Mar. 11, 2022

(87) PCT Pub. No.: WO2021/059645
PCT Pub. Date: Apr. 1, 2021

(65) Prior Publication Data
US 2022/0339080 A1    Oct. 27, 2022

(30) Foreign Application Priority Data

Sep. 27, 2019 (JP) .................... 2019-177799

(51) Int. Cl.
| | |
|---|---|
| *A61K 6/889* | (2020.01) |
| *A61K 6/30* | (2020.01) |
| *A61K 6/40* | (2020.01) |
| *A61K 6/62* | (2020.01) |
| *C08L 33/08* | (2006.01) |
| *C08L 33/10* | (2006.01) |

(52) U.S. Cl.
CPC ............... *A61K 6/889* (2020.01); *A61K 6/62* (2020.01); *A61K 6/30* (2020.01); *A61K 6/40* (2020.01); *C08L 33/08* (2013.01); *C08L 33/10* (2013.01)

(58) Field of Classification Search
CPC .. A61K 6/30; A61K 6/40; C08L 33/08; C08L 33/10
See application file for complete search history.

(56) References Cited

U.S. PATENT DOCUMENTS

| | | | |
|---|---|---|---|
| 5,545,676 A | * 8/1996 | Palazzotto | A61K 6/887 522/15 |
| 2003/0134934 A1 | 7/2003 | Kojima et al. | |
| 2010/0090157 A1 | 4/2010 | Rao et al. | |
| 2010/0311864 A1 | 12/2010 | Arita et al. | |
| 2018/0214351 A1 | 8/2018 | Fik et al. | |

FOREIGN PATENT DOCUMENTS

| | | | |
|---|---|---|---|
| JP | 2003-073218 | 3/2003 | |
| JP | 2010-514782 | 5/2010 | |
| JP | 2010-280630 | 12/2010 | |
| JP | 2018-521071 | 8/2018 | |
| JP | 2019-112343 | 7/2019 | |
| WO | 2013/046648 | 4/2013 | |
| WO | WO-2015126865 A1 * | 8/2015 | ............ A61K 6/62 |

OTHER PUBLICATIONS

International Search Report for PCT/JP2020/025573 mailed on Aug. 4, 2020.

* cited by examiner

*Primary Examiner* — Kregg T Brooks
*Assistant Examiner* — David R. Foss
(74) *Attorney, Agent, or Firm* — IPUSA, PLLC

(57) ABSTRACT

One aspect of the invention is a dental composition of a single-component dental composition including a (meth) acrylate, a photopolymerization initiator, a thiourea derivative, a water miscible organic solvent, and water, wherein the photopolymerization initiator contains a diaryliodonium salt.

3 Claims, No Drawings

DENTAL COMPOSITION AND DENTAL RESTORATIVE KIT

TECHNICAL FIELD

The present invention relates to a dental composition and a dental restorative kit.

BACKGROUND OF THE INVENTION

When prostheses are adhered to tooth surfaces with resin cements and repaired, primers are preliminarily applied to the tooth surfaces or prostheses to improve the adhesion of the resins (for example, Patent Documents 1 and 2).

On the other hand, when composite resins are directly filled into cavities to repair, bonding materials are preliminarily applied to the cavities in advance to improve the adhesion of the resins (for example, Patent Document 3).

RELATED-ART DOCUMENT

Patent Documents

Patent Document 1: Japanese Patent Application Laid-Open No. 2010-280630
Patent Document 2: International Publication No. 2013/046648
Patent Document 3: Japanese Patent Application Laid-Open No. 2003-73218

SUMMARY OF THE INVENTION

Problems to be Solved by the Invention

However, there is a need for a dental composition of a single-component dental composition capable of combining adhesion and storage stability of a resin even if the dental composition of the single-component dental composition is applied to both primers and bonding materials.

One aspect of the invention is to provide a dental composition of a single-component dental composition capable of combining adhesion and storage stability of a resin even if the dental composition of the single-component dental composition is applied to both primers and bonding materials.

Means for Solving the Problem

One aspect of the invention is a dental composition of a single-component dental composition including a (meth)acrylate, a photopolymerization initiator, a thiourea derivative, a water miscible organic solvent, and water, wherein the photopolymerization initiator contains a diaryliodonium salt.

Effects of the Invention

According to one aspect of the invention, the invention is to provide a dental composition of a single-component dental composition capable of combining adhesion and storage stability of a resin even if the dental composition of the single-component dental composition is used as both primers and bonding materials.

DETAILED DESCRIPTION OF THE INVENTION

Next, an embodiment for carrying out the present invention will be described.

[Dental Composition]

The dental composition of the present embodiment is a dental composition of a single-component dental composition.

The dental composition of the present embodiment includes (meth)acrylate, a photopolymerization initiator, a thiourea derivative, a water miscible organic solvent, and water.

The dental composition of the present embodiment can be applied, for example, to primers, bonding materials, and the like.

Hereinafter, the components constituting the dental composition of the present embodiment will be described.

[(Meth)Acrylate]

As used herein and in the claims, a (meth)acrylate refers to a compound having one or more (meth)acryloyloxy groups (for example, monomers, oligomers, prepolymers). In addition, a (meth)acryloyloxy group refers to a methacryloyloxy group and/or an acryloyloxy group.

Although a (meth)acrylate may or may not include an acid group, the dental composition of the present embodiment preferably includes (meth)acrylate having an acid group and (meth)acrylate free of an acid group. This further enhances the adhesion of the resin when the dental composition of the present embodiment is used as a primer and a bonding material.

Examples of the (meth)acrylates having an acid group include a (meth)acrylate having a phosphate group, a (meth)acrylate having a pyrophosphate group, a (meth)acrylate having a thiophosphate group, a (meth)acrylate having a carboxyl group, a (meth)acrylate having a sulfonic acid group, a (meth)acrylate having a phosphonic acid group, and the like.

It should be noted that the (meth)acrylate having an acid group may have multiple acid groups.

Alternatively, acid anhydrides, acid chlorides, alkali metal salts, amine salts (ammonium salts), and the like of the (meth)acrylates having an acid group may be used.

Phosphate groups and thiophosphate groups are more acidic than carboxyl groups. Therefore, the dental composition of the present embodiment preferably includes (meth)acrylate having a phosphate group or a thiophosphate group. As this improves teeth decalcification properties of the dental composition of the present embodiment, the adhesion of the resin is further improved when the dental composition of the present embodiment is used as a primer and a bonding material.

Examples of the (meth)acrylates having a phosphate group include 2-(meth)acryloyloxyethyl dihydrogenphosphate, bis[2-(meth)acryloyloxyethyl] hydrogenphosphate, 2-(meth)acryloyloxyethylphenyl hydrogenphosphate, 6-(meth)acryloyloxyhexyl dihydrogenphosphate, 6-(meth)acryloyloxyhexylphenyl hydrogenphosphate, 10-(meth)acryloyloxydecyl dihydrogenphosphate, 1,3-di(meth)acryloylpropane-2-dihydrogenphosphate, 1,3-di(meth)acryloylpropane-2-phenylhydrogenphosphate, bis[5-{2-(meth)acryloyloxyethoxycarbonyl}heptyl] hydrogenphosphate, and the like.

Examples of the (meth)acrylates having a pyrophosphate group include bis[2-(meth)acryloyloxyethyl] pyrophosphate, bis[4-(meth)acryloyloxybutyl] pyrophosphate, bis[6-(meth)acryloyloxyhexyl] pyrophosphate, bis[8-(meth)acryloyloxyoctyl] pyrophosphate, bis[10-(meth)acryloyloxydecyl] pyrophosphate, and the like.

Examples of the (meth)acrylates having a thiophosphate group include 2-(meth)acryloyloxyethyldihydrogen thiophosphate, 3-(meth)acryloyloxypropyldihydrogen thiophosphate, 4-(meth)acryloyloxybutyldihydrogen thiophosphate, 5-(meth)acryloyloxypentyldihydrogen thiophosphate, 6-(meth)acryloyloxyhexyldihydrogen thiophosphate, 7-(meth)acryloyloxyheptyldihydrogen thiophosphate, 8-(meth)acryloyloxyoctyldihydrogen thiophosphate, 9-(meth)acryloyloxynonyldihydrogen thiophosphate, 10-(meth)acryloyloxydecyldihydrogen thiophosphate, 11-(meth)acryloyloxyundecyldihydrogen thiophosphate, 12-(meth) acryloyloxydodecyldihydrogen thiophosphate, 13-(meth) acryloyloxytridecyldihydrogen thiophosphate, 14-(meth) acryloyloxytetradecyldihydrogen thiophosphate, 15-(meth) acryloyloxypentadecyldihydrogen thiophosphate, 16-(meth) acryloyloxyhexadecyldihydrogen thiophosphate, 17-(meth) acryloyloxyheptadecyldihydrogen thiophosphate, 18-(meth) acryloyloxyoctadecyldihydrogen thiophosphate, 19-(meth) acryloyloxynonadecyldihydrogen thiophosphate, 20-(meth) acryloyloxyicosyldihydrogen thiophosphate, and the like.

Examples of the (meth)acrylates having a carboxyl group include 4-(meth)acryloyloxyethyl trimellitic acid, 4-(meth) acryloyloxydecyl trimellitic acid, 11-(meth)acryloyloxy-1,1-undecarboxylic acid, 1,4-di(meth)acryloyloxy pyromellitic acid, 2-(meth)acryloyloxyethyl maleic acid, 2-(meth) acryloyloxyethyl phthalic acid, 2-(meth)acryloyloxyethyl hexahydrophthalic acid, and the like.

Examples of the (meth)acrylates having a sulfonic acid group include 2-(meth)acrylamide-2-methylpropanesulfonic acid, styrenesulfonic acid, 2-sulfoethyl (meth)acrylate, and the like.

Examples of the (meth)acrylates having a phosphonic acid group include 2-(meth)acryloyloxyethylphenylphosphonate, 5-(meth)acryloyloxypentyl-3-phosphonopropionate, 6-(meth)acryloyloxyhexyl-3-phosphonopropionate, 10-(meth)acryloyloxydecyl-3-phosphonopropionate, 6-(meth)acryloyloxyhexyl-3-phosphonoacetate, 10-(meth) acryloyloxydecyl-3-phosphonoacetate, and the like.

The (meth)acrylate having an acid group may be used alone or two or more kinds may be used in combination.

The content of the (meth)acrylate having an acid group in the dental composition of the present embodiment is preferably 1% by mass or more and 60% by mass or less, and further preferably 5% by mass or more and 30% by mass or less. If the content of the (meth)acrylate having an acid group in the dental composition of the present embodiment is 1% by mass or more, the adhesion of the resin is further improved when the dental composition of the present embodiment is used as a primer and a bonding material. If the content of the (meth)acrylate having an acid group in the dental composition of the present embodiment is 60% by mass or less, the storage stability of the dental composition of the present embodiment is further improved.

Examples of the (meth)acrylates free of an acid group include methyl (meth)acrylate, ethyl (meth)acrylate, isopropyl (meth)acrylate, n-butyl (meth)acrylate, isobutyl (meth) acrylate, hydroxypropyl (meth)acrylate, tetrahydrofurfuryl (meth)acrylate, glycidyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-methylhexyl (meth) acrylate, 2-ethylhexyl (meth)acrylate, benzyl (meth) acrylate, 2-hydroxy-1,3-di(meth)acryloyloxypropane, ethyleneglycol di(meth)acrylate, diethyleneglycol di(meth) acrylate, triethyleneglycol di(meth)acrylate, butyleneglycol di(meth)acrylate, neopentylglycol di(meth)acrylate, 1,3-butanediol di(meth)acrylate, 1,4-butanediol di(meth)acrylate, 1,6-hexanediol di(meth)acrylate, trimethylolpropane tri(meth)acrylate, trimethylolethane tri(meth)acrylate, pentaerythritol tri(meth)acrylate, trimethylolmethane tri(meth) acrylate, pentaerythritol tetra(meth)acrylate, polybutyleneglycol di(meth)acrylate, bisphenol A diglycidyl (meth)acrylate, di-2-(meth)acryloyloxyethyl-2,2,4-trimethylhexamethylene dicarbamate, 1,3,5-tris[1,3-bis{(meth) acryloyloxy}-2-propoxycarbonylaminohexane]-1,3,5-(1H, 3H,5H)triazine-2,4,6-trione, 2,2-bis[4-(3-(meth) acryloyloxy-2-hydroxypropyl)phenyl]propane, N,N'-(2,2,4-trimethylhexamethylene)bis[2-(aminocarboxy)propane-1,3-diol]tetramethacrylate; (meth)acrylate of urethane oligomers including 2,2'-bis(4-hydroxycyclohexyl)propane, 2-oxypanone, hexamethylene diisocyanate, and 2-hydroxyethyl(meth)acrylate; (meth)acrylate of urethane oligomers including 1,3-butanediol, hexamethylene diisocyanate, and 2-hydroxyethyl (meth)acrylate; and the like. Two or more of the (meth)acrylate free of an acid group may be used in combination.

The content of the (meth)acrylate free of an acid group in the dental composition of the present embodiment is preferably 0.5% by mass or more and 65% by mass or less, and further preferably 10% by mass or more and 35% by mass or less. If the content of the (meth)acrylate free of an acid group in the dental composition of the present embodiment is in the range of 0.5% by mass or more and 65% by mass or less, the adhesion of the resin is further improved when the dental composition of the present embodiment is used as a primer and a bonding material.

[Photopolymerization Initiator]

The photopolymerization initiator contains a diaryliodonium salt.

Examples of suitable diaryliodonium salts include diphenyliodonium hexafluorophosphate, bis(4-tert-butylphenyl) iodonium hexafluorophosphate, and the like.

Examples of the other diaryliodonium salts include diphenyliodonium, bis(p-chlorophenyl)iodonium, ditriliodonium, bis(p-tert-butylphenyl)iodonium, p-isopropylphenyl-p-methylphenyliodonium, bis(m-nitrophenyl)iodonium, (p-tert-butylphenyl)phenyliodonium, p-methoxyphenyl) phenyliodonium, bis(p-methoxyphenyl)iodonium, bis(pyridine)iodonium, (p-octyloxyphenyl)phenyliodonium, (p-phenoxyphenyl)phenyliodonium, and the like.

Examples of counter-ions of the diaryliodonium include chloride, bromide, p-toluenesulfonate, trifluoromethanesulfonate, tetrafluoroborate, tetrakis pentafluorophenylborate, tetrakis pentafluorophenyl gallate, hexafluorophosphate, hexafluoroarsenate, hexafluoroarsenate, hexafluoroantimonate, and the like.

Among these, diphenyliodonium hexafluorophosphate and bis(4-tert-butylphenyl)iodonium hexafluorophosphate are preferably used in terms of adhesion of the resin when the dental composition of the present embodiment is used as a bonding material.

The content of the diaryliodonium salts in the dental composition of the present embodiment is preferably 0.1% by mass or more and 5% by mass or less, and further preferably 0.1% by mass or more and 3% by mass or less. If the content of the diaryliodonium salts in the dental composition of the present embodiment is 0.1% by mass or more, the adhesion of the resin is further improved when the dental composition of the present embodiment is used as a bonding material. If the content is 5% by mass or less, the storage stability of the dental composition of the present embodiment is further improved.

The photopolymerization initiator may further include a photopolymerization initiator other than the diaryliodonium salts.

Examples of the photopolymerization initiators other than the diaryliodonium salts include camphorquinone, phenylbis (2,4,6-trimethylbenzoyl)phosphine oxide, 2,4,6-trimethylbenzoyl diphenylphosphine oxide, benzyl ketal, diacetyl ketal, benzyldimethyl ketal, benzyl diethyl ketal, benzylbis (2-methoxyethyl)ketal, 4,4'-dimethyl (benzyldimethyl ketal), anthraquinone, 1-chloroanthraquinone, 2-chloroanthraquinone, 1,2-benzanthraquinone, 1-hydroxyanthraquinone, 1-methylanthraquinone, 2-ethylanthraquinone, 1-bromoanthraquinone, thioxanthone, 2-isopropylthioxanthone, 2-nitrothioxanthone, 2-methylthioxanthone, 2,4-dimethylthioxanthone, 2,4-diethylthioxanthone, 2,4-diisopropylthioxanthone, 2-chloro-7-trifluoromethylthioxanthone, thioxanthone-10,10-dioxide, thioxanthone-10-oxide, benzoin methyl ether, benzoin ethyl ether, benzoin isopropyl ether, benzoin isobutyl ether, benzophenone, bis(4-dimethylaminophenyl)ketone, 4,4'-bis(diethylamino)benzophenone, and the like. Two or more of the photopolymerization initiators other than the diaryliodonium salts may be used in combination. Among these, camphorquinone, 2,4,6-trimethylbenzoyl diphenylphosphine oxide is preferably used in terms of adhesion of the resin when the dental composition of the present embodiments is used as a bonding material.

The content of the photopolymerization initiator other than the diaryliodonium salts in the dental composition of the present embodiment is preferably 0.1% by mass or more and 4% by mass or less, and further preferably 0.5% by mass or more and 3.5% by mass or less. If the content of the photopolymerization initiator other than the diaryliodonium salts in the dental composition of the present embodiment is 0.1% by mass or more, the adhesion of the resin is further improved when the dental composition of the present embodiment is used as a bonding material. If the content of the photopolymerization initiator other than the diaryliodonium salts in the dental composition of the present embodiment is 4% by mass or less, the storage stability of the dental composition of the present embodiment is improved.

[Thiourea Derivative]

The thiourea derivative functions as a reducing agent for a chemical polymerization initiator.

Examples of the thiourea derivatives include ethylene thiourea, N-methylthiourea, N-ethylthiourea, N-propylthiourea, N-butylthiourea, N-lauryl thiourea, N-phenylthiourea, N-cyclohexylthiourea, N,N-dimethyl thiourea, N,N-diethylthiourea, N,N-dipropylthiourea, N,N-dibutylthiourea, N,N-dilauryl thiourea, N,N-diphenylthiourea, N,N-dicyclohexylthiourea, trimethylthiourea, tetramethyl thiourea, N-acetylthiourea, N-benzoyl thiourea, 1-allyl-3-(2-hydroxyethyl)-2-thiourea, 1-(2-tetrahydrofurfuryl)-2-thiourea, N-tert-butyl-N'-isopropylthiourea, 2-pyridylthiourea, and the like. Two or more of the thiourea derivatives may be used in combination. Among these, N-acetylthiourea and N-benzoyl thiourea are preferably used in terms of adhesion of the resin when the dental composition of the present embodiment is used as a primer.

The content of the thiourea derivative in the dental composition of the present embodiment is preferably 0.1% by mass or more and 5% by mass or less, and further preferably 1% by mass or more and 2% by mass or less. If the content of the thiourea derivative in the dental composition of the present embodiment is 0.1% by mass or more, the adhesion of the resin is further improved when the dental composition of the present embodiment is used as a primer. If the content of the thiourea derivative in the dental composition of the present embodiment is 5% by mass or less, the storage stability of the dental composition of the present embodiment is further improved.

[Solvent]

Examples of water miscible organic solvents include acetone, methanol, ethanol, isopropyl alcohol, methyl ethyl ketone, and the like. Two or more of the water miscible organic solvents may be used in combination. Among these, acetone and ethanol are preferably used in terms of high biosafety.

The content of water in the dental composition of the present embodiment is preferably 4% by mass or more and 30% by mass or less, and further preferably 5% by mass or more and 15% by mass or less. If the content of water of the dental composition of the present embodiment is 4% by mass or more, the storage stability of the dental composition of the present embodiment is further improved. If the content of water of the dental composition of the present embodiment is 30% by mass or less, the adhesion of the resin is further improved when the dental composition of the present embodiment is used as a primer.

The mass ratio of the water miscible organic solvent to water in the dental composition of the embodiment is preferably 1.3 or greater, and further preferably is 1.8 or greater. If the mass ratio of the water miscible organic solvent to water in the dental composition of the present embodiment is 1.3 or greater, the adhesion of the resin is further improved when the dental composition of the present embodiment is used as a primer.

It should be noted that the mass ratio of the water miscible organic solvent to water in the dental composition of the present embodiment is usually 10 or less.

[Other Components]

The dental composition of the present embodiment is substantially free of vanadium compounds. This further improves the storage stability of the dental composition of the present embodiment.

The content of the vanadium compound in the dental composition of the present embodiment is preferably 0.01% by mass or less, and further preferably 0.005% by mass or less.

The vanadium compound functions as a reducing agent for a chemical polymerization initiator.

Examples of vanadium compounds include oxovanadium oxalate, vanadyl acetylacetonate, vanadium acetylacetonate, vanadyl stearate, vanadium naphthenate, vanadium benzoylacetonate, and the like.

The dental composition of the present embodiment may further include a filler, a tertiary amine, a polymerization inhibitor, and the like.

Examples of the fillers include anhydrous silicic acid powder, fumed silica, alumina powder, barium glass powder, fluoroaluminosilicate glass powder, and the like. Two or more of the fillers may be used in combination.

The filler may be treated with a surface treatment agent such as a silane coupling agent.

The tertiary amine functions as a reducing agent for a chemical polymerization initiator.

The tertiary amine may be either a tertiary aliphatic amine or a tertiary aromatic amine, but is preferably a tertiary aromatic amine, particularly an alkyl p-dialkylaminobenzoate.

Examples of the tertiary aliphatic amines include N,N-dimethylaminoethylmethacrylate, triethanolamine, and the like.

Examples of the alkyl p-dialkylaminobenzoates include methyl p-dimethylaminobenzoate, ethyl p-dimethylaminobenzoate, propyl p-dimethylaminobenzoate, amyl p-dimethylaminobenzoate, isoamyl p-dimethylaminobenzoate, ethyl p-diethylaminobenzoate, propyl p-diethylaminobenzoate, and the like.

Examples of the tertiary aromatic amines other than the alkyl p-dialkylaminobenzoate include 7-dimethylamino-4-methylcoumarin, N,N-dimethylaniline, N,N-dibenzylaniline, N,N-dimethyl-p-toluidine, N,N-diethyl-p-toluidine, N,N-bis(2-hydroxyethyl)-p-toluidine, N,N,2,4,6-pentamethylaniline, N,N,2,4-tetramethylaniline, N,N-diethyl-2,4,6-trimethylaniline, and the like.

It should be noted that the tertiary amine may be used alone or in combination with two or more kinds.

Examples of the polymerization inhibitors include dibutyl hydroxytoluene, 6-tert-butyl-2,4-xylenol, 2,6-di-tert-butyl-p-cresol. Two or more of the polymerization initiators may be used in combination.

The dental composition of the present embodiment contains a thiourea derivative. Therefore, the dental composition does not preferably contain an oxidizing agent of a chemical polymerization initiator. This further improves the storage stability of the dental composition of the present embodiment.

The dental composition of the present embodiment may also further include a reducing agent for a chemical polymerization initiator other than a thiourea derivative or a tertiary amine.

[Dental Restorative Kit]

The dental restorative kit of the present embodiment contains a dental composition of the present embodiment.

When the dental composition of the present embodiment is used as a primer, the dental composition can be used as a dental restorative kit by combining with a known resin cement (for example, Patent Documents 1 and 2). Specifically, with the primer applied to a tooth surface or prosthesis, the prosthesis is adhered to the tooth surface with the resin cement for restoration.

The resin cement includes (meth)acrylate and an oxidizing agent for the chemical polymerization initiator, and may optionally further include a photopolymerization initiator, a tertiary amine, a reducing agent for the chemical polymerization initiator, a polymerization inhibitor, and the like. The resin cement may also include a polymerization promoter, an antimicrobial, a fluorescent agent, a pigment, and the like.

Examples of the oxidizing agents for the chemical polymerization initiator include benzoyl peroxide, cumene hydroperoxide, t-butyl hydroperoxide, t-amyl hydroperoxide, 1,1,3,3-tetramethylbutyl hydroperoxide, 2,5-dimethyl-2,5-bis(hydroperoxy)hexane, p-diisopropylbenzene monohydroperoxide, p-methane hydroperoxide, pinene hydroperoxide, and the like. Two or more of the oxidizing agents for the chemical polymerization initiator may be used in combination.

The resin cement may be a self-adhesive type containing (meth)acrylate having an acid group, or a primer combination type free of (meth)acrylate having an acid group.

Examples of materials constituting prostheses include alloys containing precious metals, ceramics such as zirconia and alumina, resins, and the like.

In addition, when the dental composition of the present embodiment is used as a bonding material, the dental composition can be used as a dental restorative kit by combining with a known filler composite resin (for example, Patent Document 3). Specifically, the composite resin is repaired by filling a cavity directly with the bonding material applied to the cavity.

EXAMPLES

Hereinafter, examples of the present invention will be described, but the present invention is not limited to the examples.

Examples 1 to 10, Comparative Examples 1 to 3

The dental composition was prepared by mixing a methacrylate free of an acid group, a methacrylate having an acid group, a water miscible organic solvent, water, a photopolymerization initiator, a tertiary amine, a polymerization inhibitor, a filler, a thiourea derivative, and a diaryliodonium salt in the blends [% by mass] indicated in Table 1.

The silica powder in Table 1 is fumed silica R972 (manufactured by Aerosil Japan).

When the dental compositions were used as primers and bonding materials, the adhesion of the resin and the storage stability of the dental compositions were then evaluated.

[Adhesion of Resin when Used as Primer]

A stainless-steel rod with 10 mm in diameter was polished with #120 water-resistant abrasive paper and sandblasted to serve as a tensile test jig.

A bovine dentin was polished with #320 water-resistant abrasive paper, and a polytetrafluoroethylene seal with 100 μm in thickness, in which a hole with 2.5 mm in diameter was made in the polytetrafluoroethylene seal, was applied to the flattened polished surface of the bovine dentin to define the area of the bonded surface.

The dental composition was applied to the bonded surface of the bovine tooth, allowed to stand for 10 seconds, and dried by air blow.

A suitable amount of kneaded product of G-CEM LinkAce (manufactured by GC Corporation), which is a self-adhesive type resin cement, was applied to the tensile test jig, and then pressed against the bonded surface of the bovine dentin. Subsequently, excess cement was then removed with a probe and immersed in water at 37° C. overnight to prepare a test piece.

A precision universal tester, Autograph AG-I (manufactured by Shimadzu Corporation), was used to test the tensile strength of five test pieces at a crosshead speed of 1 ram/min, and then the average tensile strength was determined to evaluate the adhesion of the resin when the dental composition was used as a primer. The evaluation criteria of the adhesion of the resin are as follows.

Pass: When the average tensile strength is 8 MPa or more.
Fail: When the average tensile strength is less than 8 MPa.

[Adhesion of Resin when Used as Bonding Material]

A bovine dentin was polished with #320 water-resistant abrasive paper, and the flattened polished surface of the bovine dentin was defined as the bonded surface.

The dental composition was applied to the bonded surface of the bovine dentin, allowed to stand for 10 seconds, and dried by air blow. The light was then irradiated in mode F5 using a light irradiator G-light prima (manufactured by GC Corporation) from above the ULTRADENT mold with a diameter of 2.38 mm. Then, the mold was filled with a clear AP-X (manufactured by Kuraray) as a composite resin and then irradiated with light in mode 20 using the G-light prima, and the composite resin was cured. In addition, the resin was immersed in water at 37° C. overnight to prepare a test piece.

A precision universal tester, Autograph AG-I (manufactured by Shimadzu Corporation), was used to test the tensile strength of five test pieces at a crosshead speed of 1 ram/min, and then the average shear strength was determined to evaluate the adhesion of the resin when the dental composition was used as a bonding material. The evaluation criteria of the adhesion of the resin are as follows.

Pass: When the average shear strength is 20 MPa or more.
Fail: When the average shear strength is less than 20 MPa.

[Storage Stability]

The dental composition was sealed in a high-density polyethylene container and allowed to stand at 60° C. The number of days that the dental composition gelled was visually confirmed, and the storage stability of the dental composition was evaluated. The evaluation criteria for the storage stability are as follows.

Pass: When the number of days that the dental composition gelled is 8 days or longer.
Fail: When the number of days that the dental composition gelled is shorter than 8 days.

Table 1 indicates the evaluation results of the adhesion of the resins and the storage stability of the dental compositions when the dental compositions were used as primers and bonding materials.

In addition, the dental compositions in Comparative Examples 2 and 3 do not contain diaryliodonium salts. Therefore, the adhesion of the resins is low when the dental compositions are used as bonding materials.

The present application is based on and claims priority of Patent Application No. 2019-177799 filed on Sep. 27, 2019 with the Japan Patent Office, and the entire contents of Japanese Patent Application No. 2019-177799 are hereby incorporated by reference.

The invention claimed is:

1. A dental composition of a single-component dental composition comprising:
a (meth)acrylate having an acid group, a (meth)acrylate free of an acid group, a photopolymerization initiator, a thiourea derivative, a water miscible organic solvent, and water, wherein
the photopolymerization initiator contains a diaryliodonium salt,

TABLE 1

| | | Examples | | | | | | | | | | Comparative Examples | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Methacrylate free of acid group | Triethyleneglycoldi(meth)acrylate | 13 | 13 | 13 | 13 | 13 | 13 | 13 | 13 | 13 | 13 | 13 | 13 | 13 |
| | Glycerindimethacrylate | 4 | 4 | 4 | 4 | 4 | 4 | 4 | 4 | 4 | 4 | 4 | 4 | 4 |
| Methacrylate having acid group | 4-methacryloyloxyethyltrimellitic anhydride | 10 | 10 | 10 | 10 | 10 | 10 | 10 | 10 | 10 | 10 | 10 | 10 | 10 |
| | 10-methacryloyloxydecyl dihydrogenphosphate | 7 | 7 | 7 | 7 | 7 | 7 | 7 | 7 | 7 | 7 | 7 | 7 | 7 |
| Water-soluble organic solvents | Acetone | 38.4 | 38.9 | 38.2 | 38.1 | 37.9 | 43.4 | 42.9 | 43.4 | 45.1 | 46.7 | 43.1 | 39.7 | 46.2 |
| Water | | 15 | 15 | 15 | 15 | 15 | 10 | 10 | 10 | 7 | 5 | 10 | 15 | 5 |
| Diaryliodonium salts | Diphenyliodonium hexafluorophosphate | 1.3 | 0.8 | | 1.3 | 1.3 | 1.3 | 0.8 | 1.3 | 2.6 | | 2.6 | | |
| | Bis(4-tert-butylphenyl)iodonium hexafluorophosphate | | | 0.5 | | | | | | | 3.0 | | | |
| Photopolymerizing initiators other than the diaryliodonium salts | Camphorquinone | 1.5 | 1.5 | 1.5 | 1.3 | 1.0 | 1.5 | 1.5 | 1.5 | 1.5 | 1.5 | 1.5 | 1.5 | 5.0 |
| | 2,4,6-trimethylbenzoyl diphenylphosphine oxide | 2 | 2 | 2 | 2 | 2 | 2 | 2 | 2 | 2 | 2 | 2 | 2 | 2 |
| Tertiary amine | Ethyl p-dimethylaminobenzoate | 0.4 | 0.4 | 0.4 | 0.4 | 0.4 | 0.4 | 0.4 | 0.4 | 0.4 | 0.4 | 0.4 | 0.4 | 0.4 |
| Polymerization inhibitor | 2,6-di-tert-butyl-p-cresol | 0.4 | 0.4 | 0.4 | 0.4 | 0.4 | 0.4 | 0.4 | 0.4 | 0.4 | 0.4 | 0.4 | 0.4 | 0.4 |
| Filler | Silica particles | 6 | 6 | 6 | 6 | 6 | 6 | 6 | 6 | 6 | 6 | 6 | 6 | 6 |
| Thiourea derivatives | N-benzoylthiourea | 1.0 | | 2.0 | 1.5 | 2.0 | 1.0 | | | 1.0 | 1.0 | | | |
| | N-acetylthiourea | | 1.0 | | | | | 2.0 | 1.0 | | | | 1.0 | 1.0 |
| Total | | 100 | 100 | 100 | 100 | 100 | 100 | 100 | 100 | 100 | 100 | 100 | 100 | 100 |
| Evaluation results | | | | | | | | | | | | | | |
| Adhesion of the resin when used as primer [MPa] | | 14 | 14 | 15 | 15 | 14 | 16 | 17 | 16 | 17 | 17 | 7 | 14 | 15 |
| Adhesion of the resin when used as bonding material [MPa] | | 31 | 30 | 26 | 27 | 27 | 20 | 21 | 22 | 21 | 21 | 25 | 15 | 13 |
| Storage stability [number of days] | | 8 | 9 | 9 | 9 | 9 | 8 | 9 | 8 | 8 | 8 | 8 | 9 | 4 |

From Table 1, it can be seen that the dental compositions of Examples 1 to 10 have high adhesion and storage stability of the resins when used as primers and bonding materials.

In contrast, the dental composition in Comparative Example 1 does not contain a thiourea derivative. Therefore, the adhesion of the resin is low when the dental composition is used as a primer.

a content of the (meth)acrylate having the acid group in the dental composition is 1% by mass or more and 56.6% by mass or less, a content of the (meth)acrylate free of the acid group in the dental composition is 0.5% by mass or more and 56.1% by mass or less, a content of the water miscible organic solvent is 37.9% by mass or more and 46.7% by mass or less, and a content of the water is 5% by mass or more and 15% by mass or less.

2. The dental composition according to claim 1, wherein the dental composition is a primer or a bonding material.

3. A dental restorative kit including the dental composition of claim 1.

* * * * *